(12) United States Patent
Wan

(10) Patent No.: US 10,648,853 B2
(45) Date of Patent: *May 12, 2020

(54) LENS MODULE COMPRISING A BRACKET WITH A SIDE WALL BENDING AND EXTENDING FROM A TOP WALL TO FORM A SENSOR RECEIVING SPACE

(71) Applicant: AAC Technologies Pte. Ltd., Singapore (SG)

(72) Inventor: Jia Wan, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 175 days.

This patent is subject to a terminal disclaimer.

(21) Appl. No.: 15/677,066

(22) Filed: Aug. 15, 2017

(65) Prior Publication Data
US 2018/0299323 A1  Oct. 18, 2018

(30) Foreign Application Priority Data

Apr. 15, 2017  (CN) .................... 2017 2 0398118 U

(51) Int. Cl.
*G01J 1/02*  (2006.01)
*G02B 7/02*  (2006.01)
*G01J 1/04*  (2006.01)
*G02B 27/00*  (2006.01)
*G02B 5/02*  (2006.01)
*G02B 5/20*  (2006.01)

(52) U.S. Cl.
CPC .......... *G01J 1/0214* (2013.01); *G01J 1/0411* (2013.01); *G01J 1/0488* (2013.01); *G02B 5/021* (2013.01); *G02B 7/021* (2013.01); *G02B 27/0018* (2013.01); *G02B 5/208* (2013.01)

(58) Field of Classification Search
CPC ........ G02B 7/021; G02B 5/021; G02B 5/208; G01J 1/0214; G01J 1/0411; G01J 1/0488; G01J 1/0403; H04N 5/2253; H04N 5/2257
USPC .................................................. 250/239, 216
See application file for complete search history.

(56) References Cited

U.S. PATENT DOCUMENTS 7,978,424 B2 * 7/2011 Nomura ................. G02B 7/021
                                                                 359/817
2018/0299590 A1 * 10/2018 Wan ......................... G02B 7/02

* cited by examiner

*Primary Examiner* — Que Tan Le
(74) *Attorney, Agent, or Firm* — IPro, PLLC; Na Xu

(57) ABSTRACT

The present disclosure provides a lens module. The lens module includes a lens barrel with an accommodation space; a lens group accommodated in the accommodation space; a filter, a bracket and a sensor set in turn by an image side of the lens group and located outside the accommodation space. The bracket includes a top wall forming an optical aperture. The top wall includes a first surface facing an object side, a second surface opposite to the first surface and a third surface connecting the first surface to the second surface for forming an optical aperture. The third surface is a curved surface.

7 Claims, 2 Drawing Sheets

LENS MODULE COMPRISING A BRACKET WITH A SIDE WALL BENDING AND EXTENDING FROM A TOP WALL TO FORM A SENSOR RECEIVING SPACE

FIELD OF THE PRESENT DISCLOSURE

The present disclosure relates to a lens module used in a portable or mobile electronic equipment.

DESCRIPTION OF RELATED ART

With a rapid development of a multimedia technology, a digital camera, a camera and a cell phone with a webcam are more and more popular among extensive consumers, and a production to the digital camera, camera and cell phone is increasing gradually, and a requirement to the product cost and product quality is also increasing gradually, however, a bracket for a lens module is one of key components that impacts the product quality and production cost.

In the relevant technology, a bracket of a lens module has an inclined surface facing towards a sensor, and a light from a filter is reflected by this inclined surface, and a stray light reaches the sensor, and generates a section of purple flash or flare, which seriously impacts an imaging quality of the lens module.

Therefore it is necessary to provide an improved lens module for overcoming the above-mentioned disadvantages.

BRIEF DESCRIPTION OF THE DRAWING

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
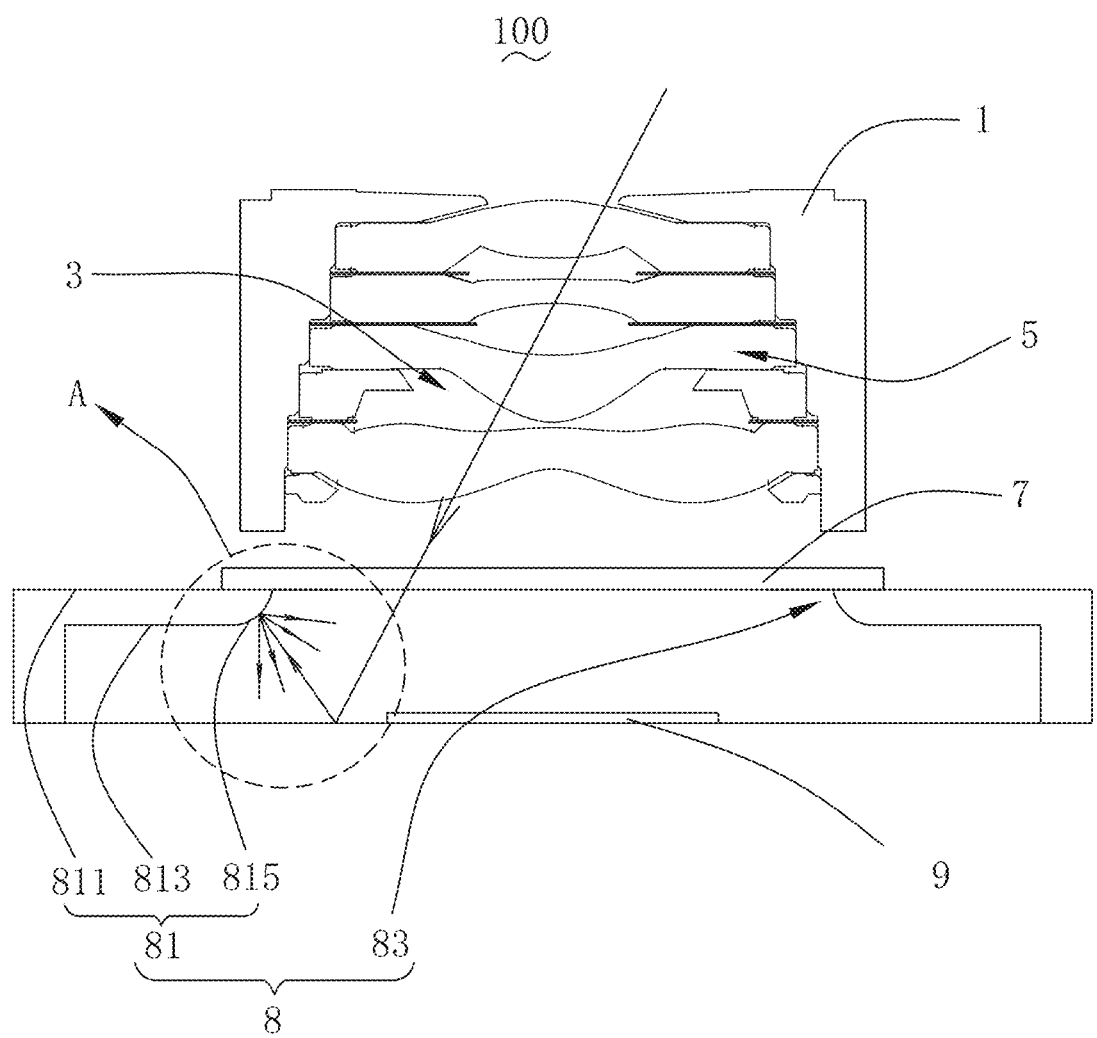
FIG. 1 is an illustrative cross-sectional view of a lens module in accordance with an exemplary embodiment of the present disclosure.
Figure 2:
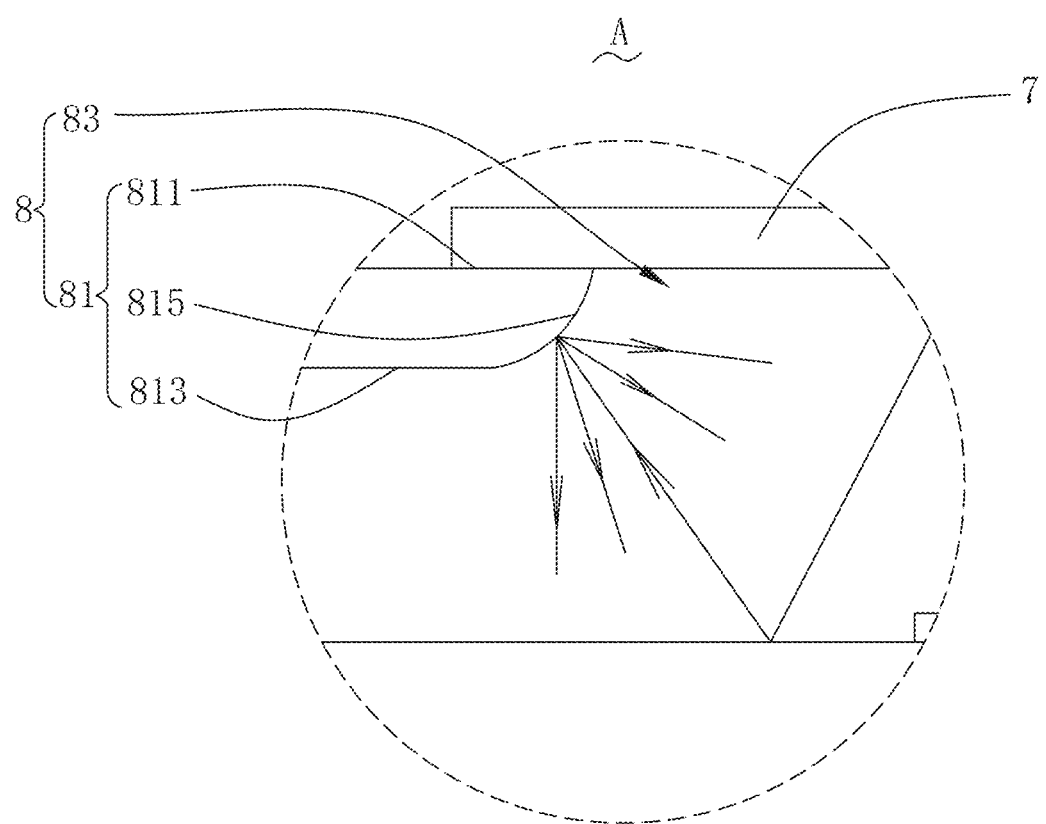
FIG. 2 is an enlarged view of Part A in FIG. 1.

Referring to FIGS. 1-2, a lens module 100 provided by the present disclosure, comprises a lens barrel 1, a lens group 5, a filter 7, a bracket 8 and a sensor 9. The lens barrel 1 has an accommodation space 3, and the lens group 5 is accommodated in the accommodation space 3, and the filter 7, the bracket 8 and the sensor 9 are arranged in turn by an image side of the lens group and outside the accommodation space 3.

In this embodiment, the filter 7 is an infrared filter, and the bracket 8 is a VCM (voice coil motor) bracket.

The bracket 8 comprises a top wall 81, and the top wall 81 forms an optical aperture 83, and the top wall 81 comprises a first surface 811, a second surface 813 and a third surface 815. The first surface 811 is arranged by facing towards an object side, and the second surface 813 is arranged opposite to the first surface 811, and the third surface 815 connects the first surface 811 and the second surface 813, and the third surface 815 is a curved surface. Preferably, the third surface 815 is a curved surface projecting towards a center of the optical aperture 83, and the third surface 815 encloses the optical aperture 83, and the filter 7 is arranged between the lens barrel 1 and the bracket 8 and supported on the first surface 811 of the bracket 8.

In this embodiment, both ends of the filter 7 are supported on the first surface 811, and the filter 7 covers the optical aperture 83, and the sensor 9 is arranged inside the bracket 8.

A distance from a connecting part between the first surface 811 and the third surface 815 to a central axis of the bracket 8 is less than a distance from a connecting part between the second surface 813 and the third surface 815 to a central axis of the bracket 8.

In this embodiment, the third surface 815 is a circular arc curved surface.

As one of preferable methods for this embodiment, the third surface 815 is a Lambertian surface, in order to further add its diffuse reflection. Generally speaking, a radiation luminance at various directions from a source of a radiation surface is different, which has an orientation. If the radiation luminance is not changing with the direction x (x is an intersectional angle between the direction of the radiation luminance and a plane normal line), then this kind of radiator is called the Lambertian surface.

Compared with relevant technologies, a lens module 100 provided by the present disclosure has a beneficial result as follows:

The lens module 100 comprises a lens barrel 1 with an accommodation space 3, a lens group 5 accommodated in the accommodation space 3, and a filter 7, a bracket 8 and a sensor 9 set in turn by an image side of the lens group 5 and outside the accommodation space 3, and the bracket 8 comprises a top wall 81 forming an optical aperture 83, and the top wall 81 comprises a first surface 811 facing towards an object side, a second surface 813 arranged opposite to the first surface 811, and a third surface 815 connecting the first surface 811 and the second surface 813 and enclosing the optical aperture 83, and the third surface 815 is a curved surface. Compared with a relevant technology where a third surface is an inclined surface, the third surface 815 is a curved surface, which can diffusely reflect the light from the filter 7 for many times, in order to diffuse the light, and weaken the light energy, and avoid a stray light reaching the sensor 9, and improve an imaging quality of the lens module 100.

Further, the third surface 815 is a circular arc curved surface, which can reduce more stray light, and further improve an imaging quality of the lens module 100.

Further, the third surface 815 is a Lambertian surface, which can minimize a stray light, in order to guarantee a premium imaging quality of the lens module.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A lens module comprising:
a lens barrel with an accommodation space;
a lens group accommodated in the accommodation space;
a filter, a bracket and a sensor set in turn by an image side of the lens group and located outside the accommodation space; wherein
the bracket comprises a top wall forming an optical aperture, the top wall comprises a first surface facing an object side, a second surface opposite to the first surface and a third surface connecting the first surface to the second surface for forming the optical aperture, the third surface is a smooth curved surface, a distance between the third surface and an optical axis being smaller and smaller along the object side to an image side;
the bracket further comprises a side wall bending and extending from the top wall, the side wall and the top wall cooperate to form a receiving space, the filter located out of the receiving space, and the sensor received in the receiving space.

2. The lens module as described in claim 1, wherein the third surface is a curved surface projecting towards a center of an optical aperture.

3. The lens module as described in claim 2, wherein the third surface is a circular arc curved surface.

4. The lens module as described in claim 1, wherein the third surface is a Lambertian surface.

5. The lens module as described in claim 4, wherein a distance from a connecting part between the first surface and the third surface to a central axis of the bracket is less than a distance from the connecting part between the second surface and the third surface to a central axis of the bracket.

6. The lens module as described in claim 1, wherein the filter is arranged between the lens barrel and the bracket, and is supported on a first surface of the bracket.

7. The lens module as described in claim 1, wherein the sensor is located in the bracket.

* * * * *